United States Patent [19]
Aitken

[11] 3,953,078
[45] Apr. 27, 1976

[54] SYSTEM OF PNEUMATIC TRANSPORT OF DOMESTIC REFUSE AND THE LIKE

[75] Inventor: Ian Miller Edington Aitken, London, England

[73] Assignee: AB Centralsug, Solna, Sweden

[22] Filed: Aug. 15, 1973

[21] Appl. No.: 387,513

[30] Foreign Application Priority Data
Aug. 15, 1972  Sweden............................ 10587/72

[52] U.S. Cl.................................... 302/27; 302/39
[51] Int. Cl.².......................................... B65G 53/06
[58] Field of Search ................... 302/11, 17, 24, 26, 302/27, 28, 36, 39, 42, 66; 193/29, 33, 34; 243/4

[56] References Cited
UNITED STATES PATENTS
3,490,813   1/1970   Hallstrom ........................ 302/27 X FOREIGN PATENTS OR APPLICATIONS
227,171     9/1969   Sweden................................ 302/39
1,084,689   9/1967   United Kingdom.................. 302/27
332,968     8/1930   United Kingdom.................. 302/27
1,223,279   2/1971   United Kingdom.................. 302/17

Primary Examiner—Evon C. Blunk
Assistant Examiner—James L. Rowland
Attorney, Agent, or Firm—Spencer & Kaye

[57] ABSTRACT

Refuse conveying suction systems for low-rise dwelling areas are operated by holding the receiving chutes closed to the atmosphere during suction periods and in permanently open communication with an underlying collecting conduit which is open to the atmosphere at one end and connected to a main vacuum conveying conduit via a main valve which is opened to initiate vacuum conveyance of refuse collected in said collecting conduit below said chutes.

4 Claims, 4 Drawing Figures

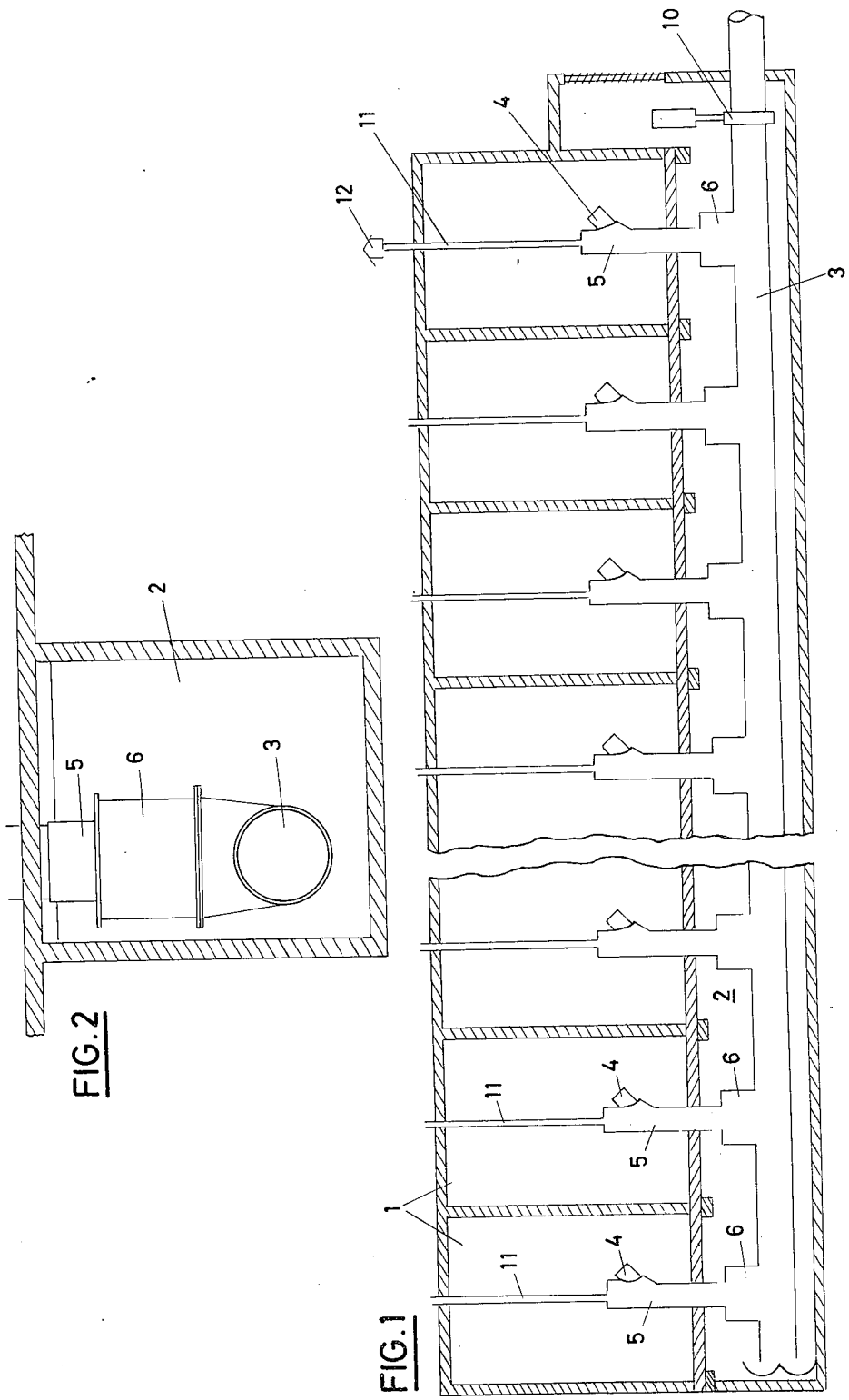

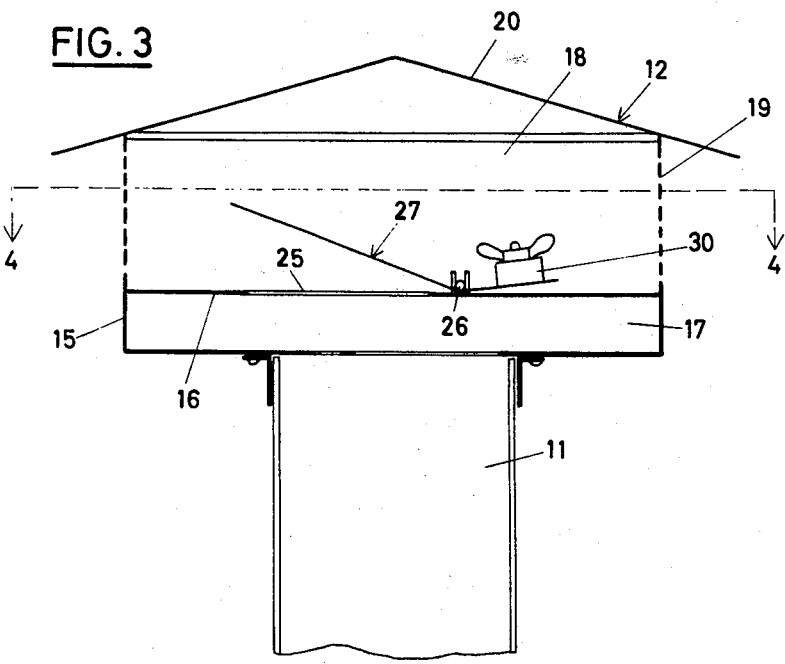
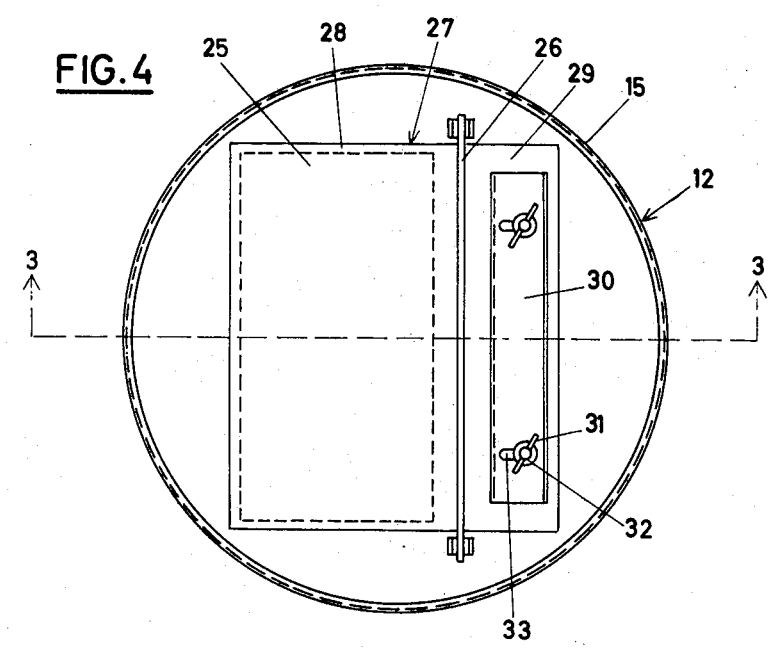

SYSTEM OF PNEUMATIC TRANSPORT OF DOMESTIC REFUSE AND THE LIKE

This invention relates to a method of conveying material and more particularly to a method of conveying material such as domestic refuse from vertical receiving chutes, which form part of a local suction transport system, into a regional suction transport system, the transport system being of the type in which, in operation, suction periods occur at spaced intervals of time. Such systems are, for example, known from U.K. Patent Specifications Nos. 1,084,689 and 1,199,917.

These U.K. Patent Specifications refer in the first place to domestic refuse suction systems for high- and medium-rise blocks of flats in which a plurality of vertical refuse chutes are provided, every refuse chute having several access ports which are each normally closed by a door or hopper. During normal operation of such a system refuse is collected on a valve disc provided at the lower end of each chute during periods of time between the suction periods. During a suction period the valve disc is displaced to enable the refuse collected thereon to enter a suction transport conduit located under the valve disc, the transport conduit being common to a plurality of vertical chutes.

In low-rise dwelling areas in which each vertical chute only would have a few access ports or, in maisonettes or terraced houses, in which each vertical chute would have only one such port, an arrangement of the type previously used in higher-rise dwellings would be unsuitable. In such a case there is no reason for providing individual valves at the lower ends of the chutes for collecting and discharging the comparatively small amounts of refuse collected during the period between adjacent suction periods. As a rule, the serial or successive discharge of the refuse contained in individual chutes will be necessary.

The present invention is particularly concerned with suction transport systems to be used in low-rise dwelling areas.

According to one aspect of the present invention there is provided a method of conveying refuse by suction from chutes forming part of a local suction transport system into a regional suction transport system, groups of said chutes being in open communication with collecting conduit forming part of the local system and being open at one end to the atmosphere, and communicating with a main suction conduit belonging to the regional suction transport system via a main valve, said method comprising the steps of maintaining a partial vacuum in said main suction conduit and periodically applying subatmospheric pressure to said collecting conduit by maintaining the chutes communicating with said conduit closed to the atmosphere and opening said valve provided at the junction between said collecting conduit and said main suction conduit.

According to another aspect of the invention there is provided a suction transport system for refuse comprising a plurality of chutes each having normally closed inlet ports and each being in open communication at the lower end thereof with a collecting conduit common for a plurality of such chutes, said collecting conduit being open at one end and communicating with a main suction conduit belonging to a regional suction system via a main valve, means being provided for closing the upper end of each such chute to the atmosphere at least during periods of time when a subatmospheric pressure is prevailing in said collecting conduit due to opening of the main valve.

In utilizing a method in accordance with the invention it is possible to bring about successive removal of the individual refuse heaps from each chute without specific control measures. For this purpose, there is provided a check valve in a vent pipe connected to the upper end of every chute, said check valve being normally open during intermediate periods between suction periods and being closed during a suction period by vacuum action, this closing of the check valves progressing successively from the chute closest to the valve in the horizontal collecting conduit towards the chutes disposed at a greater distance from said main valve, the heaps of refuse collected below the individual chutes thereby being conveyed through the collecting conduit with increasing mutual spacing.

The method and the system of the present invention may permit successful application of pneumatic refuse collection in low-rise dwelling areas at comparatively low cost and with the use of simple means. In contrast to previously known systems there is no collection of garbage at the lower end of each chute, such collection being effected by the horizontal collecting conduit which will be so dimensioned in respect to the number of attached refuse chutes that when the connecting valve leading to the main conduit is opened the heaps of refuse collected below each refuse chute in the collecting conduit will be quickly removed through said conduit into the main conduit, the conveying air stream entering into the collecting conduit through the open end thereof without the necessity of supplying conveying air from the individual refuse chutes.

It is fully possible in such a system to design each refuse chute without any connection to the surrounding atmosphere except through the normally closed insert port. However, for the purpose of preventing dust and odor from spreading to the environment of the inlet port each chute may be provided with an individual venting connection leading to the surrounding atmosphere. If such a venting connection is provided it will be necessary to close the vent pipes leading to the individual chutes during a suction period. For this purpose it will be sufficient to provide a simple check valve at the upper end of each such vent pipe. Such a check valve should be adjusted so that it will interrupt the communication between the chute and the atmosphere reliably when the subatmospheric sucking pressure is prevailing in the system whereas the check valve will be open during intermediate periods.

As a safeguard against blocking of individual chutes by insertion of unusually large amounts of garbage the connecting conduit may have an enlarged part at the place of attachment of each refuse chute.

In order that the invention may be more readily understood and so that further features thereof may be appreciated the invention will now be described by way of example with reference to the accompanying drawings in which:

FIG. 1 is a schematic elevational view of a system in accordance with the invention and comprising a plurality of stub chutes, each extending in one of a plurality of adjacent terraced houses, and a collecting conduit;

FIG. 2 is a cross-section of the collecting conduit shown in FIG. 1 taken near the place of attachment of a chute;

FIG. 3 is a vertical cross-section of the check valve at the upper end of a vent pipe, the section being taken along line 3—3 in FIG. 4; and FIG. 4 is a horizontal cross-section of the check valve taken along line 4—4 in FIG. 3.

Referring to FIG. 1 a number of terrace houses 1 or small houses arranged in a row with a common wall between two adjacent houses are shown diagrammatically in section, the houses illustrated being of the single storey type. Below the row of houses there extends a substantially horizontal collecting conduit 3 adapted to receive house-hold refuse. Each house is provided with a stub chute 5 which at the lower end is in open communication with the collecting conduit 3 each stub chute 5 having a normally closed inlet port 4 through which refuse may be introduced to the conduit 3. While the collecting conduit 3 may be directly embedded in the ground it is shown here as being enclosed in an underground culvert 2 which is shown in FIG. 2. At each point of connection juncture of a chute 5 to the conduit 3 the collecting conduit 3 has a widened portion 6 adapted to provide space (transition chamber) for exceptionally large items or amounts of refuse. Without the provision of such a widened portion excess refuse would tend to form a column extending from the bottom of the collecting conduit 3 into the chute proper with the obvious risk of the formation of a permanent plug of refuse in the lower end of the chute.

At the end of the conduit 3 shown to the right in FIG. 1 valve 10 is provided which, for example, may be in the form of a disc adapted to be moved by pneumatic or electric means between a position sealingly closing the conduit 3 and a position completely or at least substantially uncovering the cross-sectional area of conduit 3.

Beyond valve 10 conduit 3, at its right-hand end as illustrated in FIG. 1, is connected to a main conduit (not shown) and belonging to a regional suction transport system assumed to be common for a substantial number of rows of terraced houses similar to that shown in FIG. 1 and the respective collecting conduits 3. Obviously, the main conduit also may be in communication with collecting conduits coming from other types of housing areas, e.g. high- and medium-rise blocks of dwellings or semi-detached or detached houses. At the end opposite to valve 10 the collecting conduit 3 is permanently open to the atmosphere and, in the embodiment illustrated the conduit 3 opens into culvert 2, the air needed for conveying refuse collected on the bottom of the collecting conduit entering through this open end when valve 10 is opened and conduit 3 is exposed to subatmospheric pressure from the main transport conduit.

In the houses 1 every chute 5 is vented to the atmosphere by means of a narrow vent pipe 11. In view of the fact that the refuse conveying air stream present during suction periods is intended to be supplied from the open end of collecting conduit 3, the vent pipes 11 are provided at their upper ends with check valves 12, one of which is shown on top of the vent pipe 11 shown to the right in FIG. 1.

One embodiment of such a valve is shown in detail in FIGS. 3 and 4. Attached to the upper end of pipe 11 is a cylindrical housing 15 having a larger diameter than pipe 11. A transverse wall 16 divides the housing 15 into two chambers, a lower chamber 17 in open communication with vent pipe 11 and an upper chamber 18 which is in open communication with the atmosphere by means of perforations 19 which are provided in the wall of the housing 15. The upper chamber is covered by a roof 20 which projects beyond the perforated wall of the upper chamber 18. Transverse wall 16 which acts as a baffle has a rectangular port opening 25 positioned substantially above the mouth of vent pipe 11. A valve flap 27 is pivoted on a shaft 26 extending along one large side of opening 25. Valve flap 27 comprises two parts lying in mutally inter-secting planes, the larger part 28, shown to the left of shaft 26, having such an extension that in a depressed position it will sealingly cover opening 25, whereas the less extended part 29 of valve flap 27, shown to the right of shaft 26, carries a counterweight 30 which normally holds the valve flap in the open position. The counterweight 30 is adjustably attached to flap part 29 by means of wing nuts 31 and bolts 32 extending from flap part 29 through slits 33 in the counterweight 30, and thus counterweight 30 may be moved to a selected position spaced more or less from shaft 26 to adapt the opening bias of the valve flap to the pressure conditions prevailing in the system during suction periods and intermediate periods respectively.

It is to be understood that the invention is not restricted to the embodiment of a check valve shown in FIGS. 3 and 4 as any other type of check valve serving the same purpose may be used.

During operation of a system of the type illustrated in the drawings the check valve will remain in the normal open position during intervals of time between suction periods during which suction is applied to collecting conduit 3 for the removal of garbage collected therein. At the beginning of a suction period valve 10 is opened to admit vacuum to collecting conduit 3 and the chutes and vent pipes communicating therewith. Under the action of this vacuum check valves 12 will close successively with the advance of the state of vacuum through conduit 3 and conveying air will be supplied to the system only from the continuously open end of conduit 3. By the successive closing of the check valves and the progressive advance of the state of vacuum through the system the spacing between the various heaps of garbage collected below the lower ends of the chutes will increase incrementally from the start of conveyance of the heap of garbage closest to valve 10 to the last heap of garbage closest to the open left-hand end of conduit 3. Thus, any risk of clogging of conduit 3 may be successfully eliminated.

I claim:

1. A method of conveying refuse by suction from a plurality of vertical chutes forming part of a local suction transport system into a regional suction transport system, said chutes being horizontally spaced apart and in open communication with a non-vertical collecting conduit forming part of the local system, said collecting conduit being open at one end to the atmosphere and communicating at the other end thereof with a main suction conduit belonging to the regional suction transport system via a main valve, said method comprising the steps of maintaining a partial vacuum in the main suction conduit of the regional suctional transport system; periodically applying subatmospheric pressure to said collecting conduit, thus providing suction periods, by opening said main valve at the junction between the collecting conduit and the main suction conduit while maintaining the chutes communicating with said collecting conduit closed to the atmosphere; and during intermediate periods between suction periods opening check valves provided at the upper end of each chute to the atmosphere, said check valves being closed during the suction periods by action of the subatmospheric pressure with the check valves closing successively, from the chute position closest to the main valve toward the chutes disposed at a greater distance and thereby causing refuse heaps collected below the individual chutes to be conveyed in turn through the collecting conduit with increasing spacing from the main valve.

2. A suction transport system for refuse comprising:
a regional suction system having a main suction conduit with means for maintaining a subatmospheric pressure therein;
a non-vertical collecting conduit opening into said main suction conduit through a main valve, said collecting conduit being open to the atmosphere at its end remote from the main valve;
a plurality of vertical chutes each having normally closed inlet ports and each being in open, unobstructed communication at the lower end thereof with the collecting conduit, said plurality of chutes being horizontally spaced apart and opening into the collecting conduit between the main valve and the spaced open end of said collecting conduit; and
means for closing the upper end of each chute to the atmosphere at least during periods of time when a subatmospheric pressure is prevailing in said collecting conduit due to opening of the main valve to the main suction conduit of the regional suction system.

3. A system in accordance with claim 2 wherein the respective junctures of the collecting conduit and several chutes are widened to provide enlarged transition chambers.

4. A suction transport system for refuse comprising:
a regional suction system having a main suction conduit with means for maintaining subatmospheric pressure therein;
a non-vertical collecting conduit opening into said main suction conduit through a main valve, said collecting conduit being open to the atmosphere at its end remote from the main valve;
a plurality of vertical chutes each having normally closed inlet ports and each being in open, unobstructed communication at the lower end thereof with the collecting conduit, said plurality of chutes being horizontally spaced apart and opening into the collecting conduit between the main valve and the spaced open end of said collecting conduit; and
means for closing the upper end of each chute to the atmosphere during periods of time when a subatmospheric pressure is prevailing in said collecting conduit due to opening of the main valve to the main suction conduit of the regional suction system, said closing means comprising a check valve provided at the upper end of each chute which closes the chute to atmospheric pressure when a subatmospheric pressure prevails in the collecting conduit and which check valve opens the chute to atmospheric pressure in the absence of a prevailing subatmospheric pressure in the collecting conduit.

* * * * *